(12) United States Patent
Ishizuka et al.

(10) Patent No.: US 10,744,479 B2
(45) Date of Patent: Aug. 18, 2020

(54) CHEMICAL REACTION APPARATUS

(71) Applicant: Microwave Chemical Co., Ltd., Osaka-Shi, Osaka (JP)

(72) Inventors: Akinori Ishizuka, Osaka (JP); Yukari Deguchi, Osaka (JP); Yasunori Tsukahara, Osaka (JP)

(73) Assignee: MICROWAVE CHEMICAL CO., LTD., Osaka-Shi, Osaka (JP)

( * ) Notice: Subject to any disclaimer, the term of this patent is extended or adjusted under 35 U.S.C. 154(b) by 135 days.

(21) Appl. No.: 15/321,989

(22) PCT Filed: Jun. 17, 2015

(86) PCT No.: PCT/JP2015/067411
§ 371 (c)(1),
(2) Date: Mar. 22, 2017

(87) PCT Pub. No.: WO2015/198931
PCT Pub. Date: Dec. 30, 2015

(65) Prior Publication Data
US 2017/0203273 A1 Jul. 20, 2017

(30) Foreign Application Priority Data
Jun. 24, 2014 (JP) .................. 2014-128981

(51) Int. Cl.
*B01J 19/12* (2006.01)
*B01J 8/26* (2006.01)
(Continued)

(52) U.S. Cl.
CPC ............. *B01J 19/126* (2013.01); *B01J 8/001* (2013.01); *B01J 8/005* (2013.01); *B01J 8/006* (2013.01);
(Continued)

(58) Field of Classification Search
CPC ..................................................... B01J 19/126
See application file for complete search history.

(56) References Cited

U.S. PATENT DOCUMENTS

| 5,393,320 A | 2/1995 | Gomez |
| 2004/0056026 A1 | 3/2004 | Jakes et al. |
| 2006/0237300 A1* | 10/2006 | Stroder ................. B01J 8/1872 204/157.15 |

FOREIGN PATENT DOCUMENTS

| JP | S58-128140 A | 7/1983 |
| JP | S59-004431 | 1/1984 |

(Continued)

OTHER PUBLICATIONS

International Search Report dated Sep. 29, 2015 issued in corresponding PCT International Application No. PCT/JP2015/067411.
(Continued)

*Primary Examiner* — Stuart L Hendrickson
(74) *Attorney, Agent, or Firm* — Troutman Pepper Hamilton Sanders LLP

(57) ABSTRACT

In order to suppress discharge of an unreacted content in a chemical reaction apparatus for irradiating a content with microwaves, a chemical reaction apparatus includes: a horizontal flow-type reactor in which a liquid content horizontally flows with an unfilled space being provided thereabove; a microwave generator that generates microwaves; and a waveguide that transmits the microwaves generated by the microwave generator to the unfilled space in the reactor, wherein the inside of the reactor is partitioned into multiple chambers to by overflow-type partition plates and that allow the content to flow thereover and an underflow-type partition plate that allows the content to flow thereunder.

7 Claims, 16 Drawing Sheets

(51) Int. Cl.
| | |
|---|---|
| *H05B 6/80* | (2006.01) |
| *B01J 8/38* | (2006.01) |
| *B01J 8/20* | (2006.01) |
| *B01J 8/00* | (2006.01) |
| *B01J 8/04* | (2006.01) |
| *B01J 8/08* | (2006.01) |
| *B01J 8/10* | (2006.01) |
| *B01J 19/00* | (2006.01) |

(52) U.S. Cl.
CPC ............ *B01J 8/008* (2013.01); *B01J 8/0403* (2013.01); *B01J 8/087* (2013.01); *B01J 8/10* (2013.01); *B01J 8/20* (2013.01); *B01J 8/26* (2013.01); *B01J 8/382* (2013.01); *B01J 8/388* (2013.01); *B01J 19/006* (2013.01); *B01J 19/0013* (2013.01); *H05B 6/80* (2013.01); *H05B 6/806* (2013.01); *B01J 2208/00061* (2013.01); *B01J 2208/0084* (2013.01); *B01J 2208/00176* (2013.01); *B01J 2208/00442* (2013.01); *B01J 2208/00761* (2013.01); *B01J 2208/00787* (2013.01); *B01J 2208/00867* (2013.01); *B01J 2219/00063* (2013.01); *B01J 2219/00202* (2013.01); *B01J 2219/00211* (2013.01); *B01J 2219/00234* (2013.01); *B01J 2219/00768* (2013.01); *B01J 2219/0871* (2013.01); *B01J 2219/0877* (2013.01); *B01J 2219/0892* (2013.01); *B01J 2219/1215* (2013.01); *B01J 2219/1227* (2013.01); *B01J 2219/1239* (2013.01); *B01J 2219/1245* (2013.01); *B01J 2219/1269* (2013.01); *B01J 2219/1272* (2013.01); *B01J 2219/1296* (2013.01); *B01J 2219/182* (2013.01)

(56) References Cited

FOREIGN PATENT DOCUMENTS

| | | |
|---|---|---|
| JP | S63-264134 A | 11/1988 |
| JP | S63264134 A | 11/1988 |
| JP | 2006511775 A | 4/2006 |
| JP | 2006512554 A | 4/2006 |
| JP | 2011234263 A | 11/2011 |
| JP | 2011235262 A | 11/2011 |
| JP | 2011235263 A | 11/2011 |
| JP | 2013103159 A | 5/2013 |
| JP | 2013103160 A | 5/2013 |
| JP | 2013107058 A | 6/2013 |
| JP | 2014099304 A | 5/2014 |
| WO | 2004056468 A1 | 7/2004 |
| WO | 2004056471 A1 | 7/2004 |

OTHER PUBLICATIONS

Notification of Reasons for Rejection dated Aug. 5, 2014 issued in corresponding Japanese Patent Application No. 2014-128981.
Notification of Reasons for Rejection dated Nov. 11, 2014 issued in corresponding Japanese Patent Application No. 2014-128981.
Notification of Result of Substantive Examination dated Jun. 27, 2019 issued in corresponding Indonesian Patent Application No. P-00201700430.

* cited by examiner ial Patent Application Serial No. PCT/JP2015/067411, filed Jun. 17, 2015, which claims priority to Japanese Patent Application No. 2014-128981, filed Jun. 24, 2014, both of which are herein incorporated by reference in their entireties.

CHEMICAL REACTION APPARATUS

CROSS-REFERENCE TO RELATED APPLICATIONS

This application is the U.S. National Phase of International Patent Application Serial No. PCT/JP2015/067411, filed Jun. 17, 2015, which claims priority to Japanese Patent Application No. 2014-128981, filed Jun. 24, 2014, both of which are herein incorporated by reference in their entireties.

TECHNICAL FIELD

The present invention relates to a chemical reaction apparatus for irradiating a liquid content in a reactor with microwaves.

BACKGROUND

Conventionally, there are known chemical reaction apparatuses for irradiating a content with microwaves (electromagnetic waves), thereby performing heating or the like of the content (see Japanese Unexamined Application Publication No. 2011-235262A, for example).

SUMMARY

However, there is a demand for conventional chemical reaction apparatuses to reduce the possibility that an unreacted content is discharged.

The present invention was arrived at in view of these circumstances, and it is an object thereof to provide a chemical reaction apparatus capable of suppressing discharge of an unreacted content by preventing the content from flowing in a shortcut through a horizontal flow-type reactor.

In order to achieve the above-described object, the present invention is directed to a chemical reaction apparatus, including a horizontal flow-type reactor in which a liquid content horizontally flows with an unfilled space being provided thereabove; a microwave generator that generates microwaves; and a waveguide that transmits the microwaves generated by the microwave generator to the unfilled space in the reactor, wherein the inside of the reactor is partitioned into multiple chambers by an overflow-type partition plate that allows the content to flow thereover and an underflow-type partition plate that allows the content to flow thereunder but does not allow the content to flow therebeside, and a portion of the underflow-type partition plate corresponding to the unfilled space is provided with a space through which microwaves can pass.

With this configuration, in a portion where an overflow-type partition plate and an underflow-type partition plate are adjacent to each other, the content moves from below to above or from above to below inside the reactor, and the movement distance of the content increases. As a result, the content is irradiated with microwaves for a longer period of time, and discharge of an unreacted content can be suppressed. Since a portion of the underflow-type partition plate corresponding to the unfilled space is provided with a space through which microwaves can pass, microwaves can pass between chambers also via a route over the underflow-type partition plate.

Furthermore, the chemical reaction apparatus according to the present invention may be configured such that the overflow-type partition plate and the underflow-type partition plate are alternately arranged along a flow direction of the content.

With this configuration, the path through which the content flows can be made longer, and discharge of an unreacted content can be suppressed.

Furthermore, the chemical reaction apparatus according to the present invention may be configured such that a distance between two partition plates arranged adjacent to each other along the flow direction in the order of an overflow-type partition plate and an underflow-type partition plate is larger than a distance between two partition plates arranged adjacent to each other along the flow direction in the order of an underflow-type partition plate and an overflow-type partition plate.

With this configuration, for example, if a flowing solid catalyst having a specific gravity that is larger than that of the content is present in the reactor, the fact that it is difficult for the solid catalyst to move upward between the two partition plates arranged adjacent to each other along the flow direction in the order of an underflow-type partition plate and an overflow-type partition plate may be used to retain the solid catalyst in that chamber.

Furthermore, the chemical reaction apparatus according to the present invention may be configured such that a distance between two partition plates arranged adjacent to each other along the flow direction in the order of an underflow-type partition plate and an overflow-type partition plate is larger than a distance between two partition plates arranged adjacent to each other along the flow direction in the order of an overflow-type partition plate and an underflow-type partition plate.

With this configuration, for example, if a flowing solid catalyst having a specific gravity that is smaller than that of the content is present in the reactor, the fact that it is difficult for the solid catalyst to move downward between the two partition plates arranged adjacent to each other along the flow direction in the order of an overflow-type partition plate and an underflow-type partition plate may be used to retain the solid catalyst in that chamber.

Furthermore, the chemical reaction apparatus according to the present invention may be configured such that distances between two partition plates adjacent to each other are equal.

Furthermore, the chemical reaction apparatus according to the present invention may be configured such that, in a flow path of a content under the underflow-type partition plate, a distance between the underflow-type partition plate and a lower face of the reactor is constant.

With this configuration, the range of the distribution of flow rates of the content that flows under the underflow-type partition plate may be narrowed, and thus the flow rate can be made more uniform. As a result, a situation where the content flows through mainly a portion of the flow path at the underflow-type partition plate is suppressed, and thus flowing of the content in a shortcut can be more reliably suppressed.

With the chemical reaction apparatus according to the present invention, it is possible to suppress discharge of an unreacted content by preventing the content from flowing in a shortcut.

DETAILED DESCRIPTION

Figure 1:
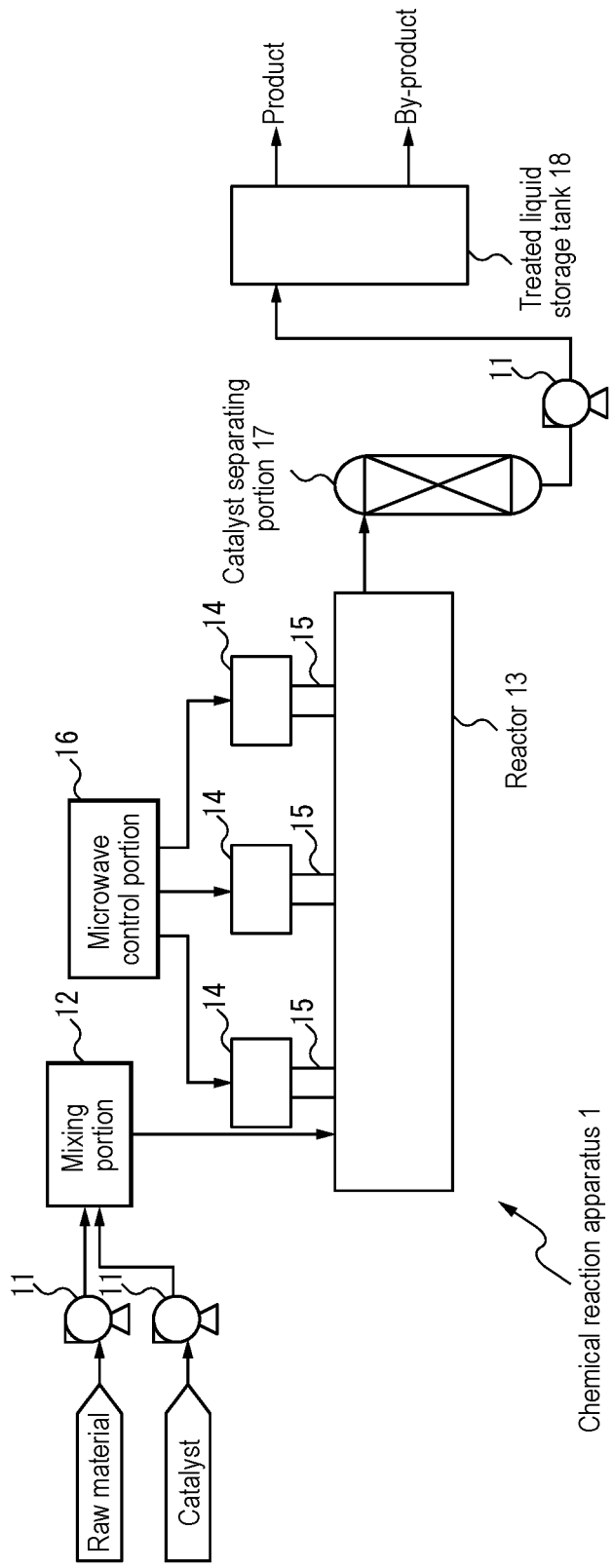
FIG. 1 is a diagram showing the configuration of a chemical reaction apparatus according to Example 1 of the present invention.

Hereinafter, examples of a chemical reaction apparatus according to the present invention will be described. Note that constituent elements denoted by the same reference numerals are the same as or similar to each other in the following examples, and thus a description thereof may not be repeated.

Example 1

Below, a chemical reaction apparatus according to Example 1 of the present invention will be described with reference to the drawings. The chemical reaction apparatus according to this example irradiates, with microwaves, a content of a reactor whose inside is partitioned by overflow-type partition plates and underflow-type partition plates into multiple chambers.

FIG. 1 is a diagram showing the configuration of a chemical reaction apparatus 1 according to this example. The chemical reaction apparatus 1 according to this example includes a mixing portion 12, a reactor 13, microwave generators 14, waveguides 15, a microwave control portion 16, a catalyst separating portion 17, and a treated liquid storage tank 18.

The mixing portion 12 mixes a raw material and a solid catalyst. The mixing portion 12 may mix the raw material and the like with a reactant. The raw material may contain multiple materials. For example, in the case of performing esterification in the reactor 13, fat and oils and alcohol may be used as the raw material. The raw material and the solid catalyst may be supplied to the mixing portion 12 by pumps 11 as shown in FIG. 1, or may be supplied to the mixing portion 12 using other methods. The mixing portion 12 may mix two or more materials, for example, by rotating a blade-like member, a wing-like member, or a screw-like member. Note that, although this example describes the case in which the catalyst that is to be mixed with the raw material is a solid catalyst (heterogeneous catalyst), the catalyst may be a liquid catalyst (homogeneous catalyst). The solid catalyst may or may not form a fluidized bed inside the reactor 13. There is no limitation on the shape of the solid catalyst. Examples of the shape of the solid catalyst include various grains, a cylinder (that may or may not be hollow, for example), a sphere, a pellet, a ring, a shell, and other shapes. The solid catalyst may or may not be, for example, microwave-absorbing or microwave-sensitive. If the solid catalyst is microwave-absorbing or microwave-sensitive, when microwave irradiation is performed inside the reactor 13 (described later), the solid catalyst is heated by the microwaves, and the chemical reaction near the solid catalyst is facilitated. Note that the microwave absorptivity and the microwave sensitivity depend on the frequency of microwaves used for irradiation, the temperature inside the reactor 13, and the like. That is to say, materials that have a high dielectric loss factor, at the frequency of microwaves used and the temperature inside the reactor 13 in which the raw material is to undergo a reaction, provide a high microwave absorptivity. Accordingly, for example, a solid catalyst containing such a highly microwave-absorbing material may be used. For example, if microwaves at 2.45 GHz are irradiated, examples of the microwave-absorbing material include carbon (e.g., graphite, carbon nanotube, activated carbon, etc.) except for fullerene, iron, nickel, cobalt, ferrite, and the like. Accordingly, the solid catalyst may contain such a microwave-absorbing material. Specifically, the solid catalyst may be a composite in which such a microwave-absorbing or microwave-sensitive material and a metal or metal oxide are combined, a composite in which such a microwave-absorbing or microwave-sensitive material and a catalyst such as alkali catalyst or acid catalyst are combined, or a composite in which a microwave-absorbing or microwave-sensitive material, a catalyst such as alkali catalyst or acid catalyst, and a metal or metal oxide are combined. The composite may be formed, for example, through physical adsorption, chemical bonding, alloying, or other methods. Furthermore, in the mixing portion 12, preliminary heating may or may not be performed for preparation for the reaction in the reactor 13. In the case of performing the preliminary heating, the temperature in the preliminary heating in the mixing portion 12 is preferably controlled such that the raw material and the like at the time of entering the reactor 13 are at a desired temperature or in a desired temperature range. Note that, in the case of not performing the preliminary heating in the mixing portion 12, heating corresponding to the preliminary heating may be performed in the reactor 13. The raw material and the solid catalyst mixed by the mixing portion 12 are loaded into the reactor 13.

The reactor 13 is a horizontally extending reaction unit in which a liquid content is placed with an unfilled space being provided thereabove. The reactor 13 is of a flow-type. That is to say, the reactor 13 is a horizontal flow-type reaction unit in which a liquid content horizontally flows with an unfilled space being provided thereabove. The direction in which the content flows is the longitudinal direction of the reactor 13. In the reactor 13 shown in FIG. 1, the left-right direction in the drawing is the longitudinal direction of the reactor 13, and the content flows from the left to the right in the drawing. Accordingly, the content is loaded on the upstream side in the reactor 13, that is, on the left side in the drawing. Examples of the content of the reactor 13 include a mixture of the raw material and the catalyst. The raw material and the catalyst mixed by the mixing portion 12 flow inside the reactor 13. Note that, since the chemical reaction in the reactor 13 produces a product material from the raw material, the content of the reactor 13 may be considered to contain the product material. That is to say, the content may be referred to as the raw material and/or the product material. Since an unfilled space is present above the content, the content is typically a material other than gas. The content can flow inside the reactor 13 and has a flat liquid surface, and, thus, the content is a material other than solid (e.g., powders or grains, etc.). Accordingly, the content is liquid. The liquid content may be, for example, a material having a high flowability such as water, oil, aqueous solution, or colloidal solution, or may be a material having a low flowability such as slurry or suspension. It is preferable that the liquid surface of the content inside the reactor 13 is kept horizontal, and, thus, even in the case where the flowability of the liquid content is low, it preferably allows the liquid surface to be horizontal after a while without the application of vibration from the outside. That is to say, the liquid content preferably has a flowability that allows the shape of the surface to be changed without vibration from the outside. Note that the liquid surface being horizontal may refer to the state of being completely flat, or may refer to the state of being flat on the whole although there are slightly rough portions. The reason for this is that, if the content does not have a high flowability, the liquid surface may not be completely flat. The inner wall of the reactor 13 is preferably made of a microwave-reflecting material. Examples of the microwave-reflecting material include metals such as stainless steel. The internal configuration of the reactor 13 will be described later.

The microwave generators 14 generate microwaves. The chemical reaction apparatus 1 according to this example may include one microwave generator 14, or may include two or more microwave generators 14. There is no limitation on the frequency of the microwaves, and examples thereof include 2.45 GHz, 5.8 GHz, 24 GHz, 915 MHz, and other frequencies ranging from 300 MHz to 300 GHz. If the chemical reaction apparatus 1 includes two or more microwave generators 14, the frequencies of the microwaves generated by the microwave generators 14 may be the same, or may be different from each other. In the latter case, for example, microwave irradiation at a frequency A may be performed on the upstream side in the flow direction in the reactor 13 and microwave irradiation at a frequency B may be performed on the downstream side, or microwave irradiation at frequencies A and B may be performed at the same position in the flow direction in the reactor 13. Note that it is assumed that the frequency A and the frequency B are different from each other.

The waveguides 15 transmit the microwaves generated by the microwave generators 14 to the unfilled space in the reactor 13. The number of waveguides 15 provided may be the same as the number of microwave generators 14 as shown in FIG. 1. Furthermore, one waveguide 15 may be branched and transmit the microwaves to two or more positions in the unfilled space. Note that the specification of the waveguides 15 is preferably in accordance with the frequency of the microwaves generated by the microwave generators 14.

The microwave control portion 16 controls the output (power) of microwaves used for irradiation in the reactor 13, according to the temperature measured by temperature measuring portions 25 (described later). The control by the microwave control portion 16 makes it possible to keep the temperature inside the reactor 13 at a desired temperature or in a desired temperature range.

The catalyst separating portion 17 separates the catalyst from the product material after the reaction in the reactor 13. If the catalyst that has been mixed with the raw material is a solid catalyst, for example, filtering may be used to separate the solid catalyst, or one of the solid catalyst and the product material may be precipitated to separate the solid catalyst. Furthermore, if the solid catalyst contains a magnetic substance, a magnet that attracts the solid catalyst may be used to separate the solid catalyst. Note that the separated solid catalyst may be used again as appropriate. Furthermore, if a liquid catalyst is used, distillation, extraction, or neutralization may be performed in the catalyst separating portion 17 to separate the catalyst.

The product material from which the catalyst has been separated by the catalyst separating portion 17 is loaded into the treated liquid storage tank 18. Then, this product material is separated as appropriate into a final product, a by-product, and the like. For example, if the raw material is free fatty acid and esterification is performed in the reactor 13, a product that is biodiesel fuel and a by-product that is water are obtained. In this case, an acid catalyst is used. Furthermore, for example, if the raw material is triglyceride and transesterification is performed in the reactor 13, a product that is biodiesel fuel and a by-product that is glycerin are obtained. In this case, an alkali catalyst is used.

Note that an unshown cooler that cools down the material after the reaction in the reactor 13 may or may not be provided on the path after the reactor 13. In the former case, for example, the cooler may use water to cool down the material after the reaction in the reactor 13.

Figure 2A:
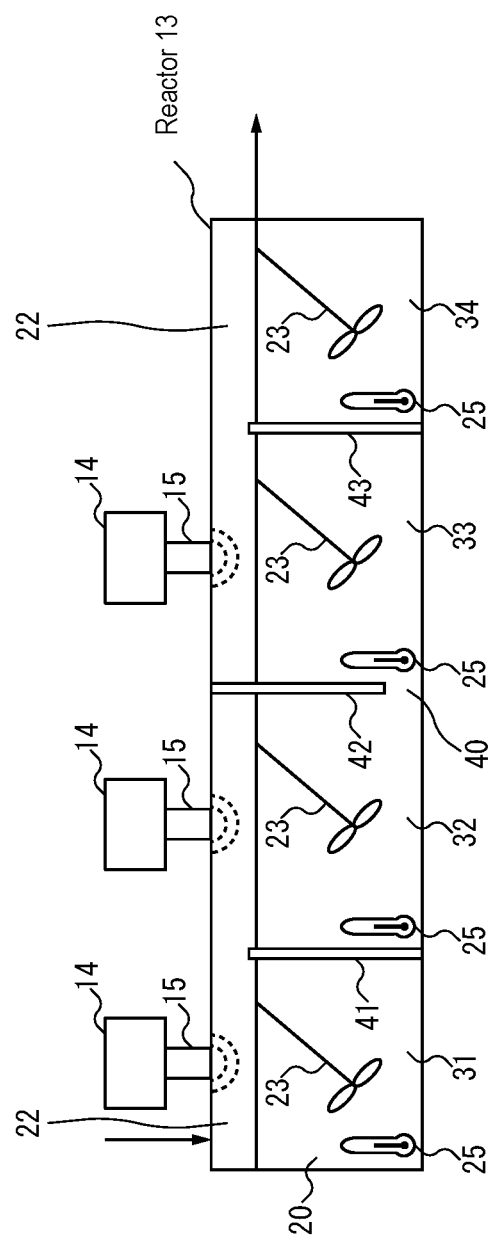
FIG. 2A is a diagram showing an example of the configuration inside a reactor in this example.

FIG. 2A is a diagram showing an example of the internal configuration of the reactor 13 according to this example. It is preferable that an unfilled space 22 is present throughout the longitudinal direction of the reactor 13 (e.g., the left-right direction in FIG. 2A), but there is no limitation to this. In FIG. 2A, the inside of the reactor 13 is partitioned by partition plates 41 to 43 into multiple chambers 31 to 34. The multiple chambers 31 to 34 are chambers that are continuously arranged in series. Among the multiple partition plates 41 to 43, the partition plates 41 and 43 are overflow-type partition plates that allow a content 20 to flow thereover. That is to say, if the content 20 moves via the partition plates 41 and 43 to the next chamber, the content 20 mainly flows over the partition plates 41 and 43. The partition plate 42 is an underflow-type partition plate that allows the content 20 to flow thereunder. That is to say, if the content 20 moves via the partition plate 42 to the next chamber, the content 20 mainly flows under the partition plate 42, and does not flow beside the partition plate 42. In the reactor 13 in FIG. 2A, the overflow-type partition plates 41 and 43 and the underflow-type partition plate 42 are alternately arranged along the flow direction (e.g., the direction from the left to the right in FIG. 2A) of the content 20. The state in which the overflow-type partition plates and the underflow-type partition plate are alternately arranged may refer to a state in which at least part of the multiple partition plates in the reactor 13 are arranged in this manner. The partition plates 41 to 43 are arranged such that distances between two partition plates adjacent to each other are equal. That is to say, the distance between the partition plates 41 and 42 is equal to the distance between the partition plates 42 and 43. At the positions of the partition plates 41 and 43, the content 20 flows over the partition plates 41 and 43, and, at the position of the partition plate 42, the content 20 flows under the partition plate 42. Accordingly, for example, in the chamber 32, the content 20 flows in from the upper side and flows out from the lower side, and thus the movement path of the content 20 becomes longer than that in the case where both partition plates on the inlet and outlet sides of the chamber 32 are of the overflow-type. As a result, a reaction inside the reactor 13 is facilitated, and the possibility that an unreacted content 20 is discharged from the reactor 13 can be reduced.

Figure 2B:
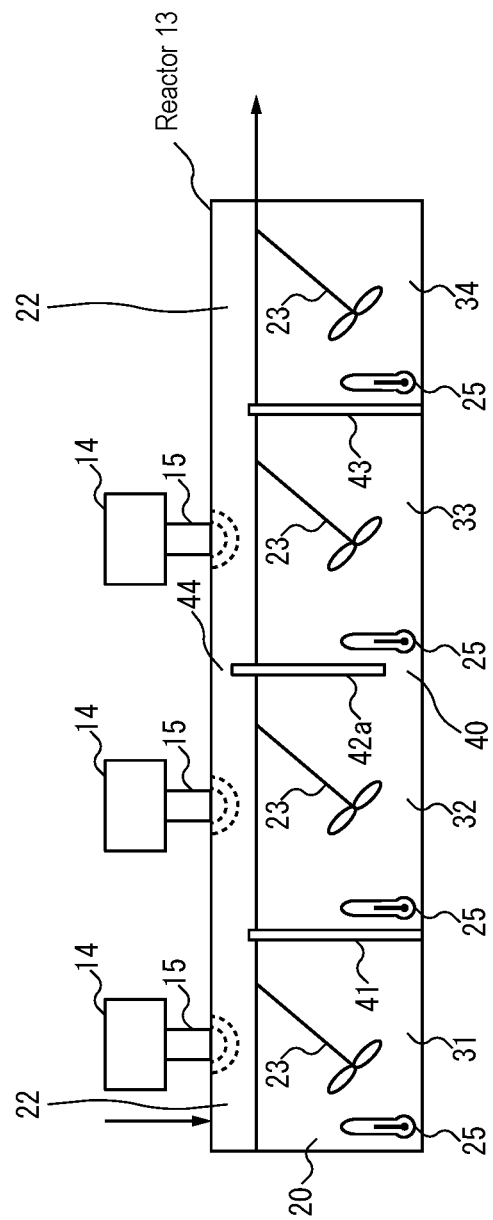
FIG. 2B is a diagram showing an example of the configuration inside the reactor in this example.

As described above, the unfilled space 22 is present in the upper portion inside the reactor 13. The unfilled space 22 is irradiated with the microwaves generated by the microwave generators 14 and transmitted via the waveguides 15. Note that FIG. 2A shows the case in which the unfilled space 22 inside the reactor 13 is divided by the partition plate 42, but, for example, as shown in FIG. 2B, there is no limitation to this. That is to say, the unfilled space 22 may be shared by all of the chambers 31 to 34, or may be shared by at least part of the chambers. In the former case, a single unfilled space is formed in the reactor 13, and, in the latter case, multiple unfilled spaces are formed in the reactor 13. The waveguides 15 may or may not be provided at the positions around the middle in the corresponding chambers. In the former case, for example, the microwaves that have been transmitted by one waveguide 15 to the unfilled space 22 are mainly irradiated on the chamber present therebelow. Since microwaves are transmitted through the unfilled space 22, for example, the microwaves that have been transmitted by the waveguide 15 at the position of the chamber 33 are irradiated via the unfilled space 22 also on the content 20 in the chamber 34. Note that the waveguides 15 may be provided at the positions of the partition plates 41 to 43, that is, at the positions above the partition plates 41 to 43. Accordingly, the microwaves that have been transmitted by one waveguide 15 to the unfilled space 22 are mainly irradiated on two chambers that have been partitioned from each other by the partition plate at the position corresponding to that waveguide 15. If the unfilled space 22 is shared by multiple chambers, the microwaves that have been transmitted to the shared unfilled space 22 are irradiated on the content 20 in the multiple chambers sharing the unfilled space 22. In FIG. 2A, the chamber 34 is not directly irradiated with microwaves, but the chamber 34 may also be irradiated with microwaves via a waveguide 15.

The partition plates 41 to 43 may independently transmit microwaves, absorb microwaves, or reflect microwaves. Examples of the microwave-transmitting material include Teflon (registered trademark), quartz glass, ceramic, silicon nitride-alumina, and the like. Accordingly, the partition plates that transmit microwaves may be made of such a microwave-transmitting material. Furthermore, examples of the microwave-absorbing material include carbon except for fullerene, and the like. Accordingly, the partition plates that absorb microwaves may be made of such a microwave-absorbing material. Furthermore, examples of the microwave-reflecting material include metal. Accordingly, the partition plates that do not transmit microwaves may be made of such a microwave-reflecting material. Furthermore, the partition plates may be made of a combination of two or more materials freely selected from the microwave-transmitting material, the microwave-absorbing material, and the microwave-reflecting material.

Furthermore, as shown in FIG. 2A, the chemical reaction apparatus 1 may include one or more agitation units 23 that rotationally agitate the content 20 inside the reactor 13. FIG. 2A shows the case in which the chambers 31 to 34 respectively have the agitation units 23, but there is no limitation to this. One or more chambers may have no agitation unit 23. Furthermore, FIG. 2A shows the case in which each of the agitation units 23 is in the shape of a blade, but this merely schematically shows the agitation units 23. The agitation may be performed, for example, by rotating a blade-like, wing-like, or rod-like rotatable member. The rotatable member may be made of a microwave-transmitting material, a microwave-absorbing material, a microwave-reflecting material, or a combination of two or more materials freely selected from the microwave-transmitting material, the microwave-absorbing material, and the microwave-reflecting material. The rotation may be performed, for example, by rotating a rotatable member attached to a shaft in accordance with the rotation of the shaft, or by rotating the rotatable member using a magnetic force as in the case of a magnetic stirrer. In the former case, i.e., when using a shaft, the shaft may be provided independently for each chamber, or may be shared by multiple chambers. In the latter case, i.e., when using a magnetic force, the rotatable member (magnetic stirrer) in the shape of a rod, a blade, a wing, or the like is rotated by a magnet. The agitation of the content 20 by the agitation units 23 may be used to cause the content 20 to flow from the upstream side to the downstream side, or in the opposite direction, but there is no limitation to this. Note that rotational agitation is already known, and, thus, a detailed description thereof has been omitted.

Hereinafter, reasons why the content 20 of the reactor 13 is rotationally agitated by the agitation units 23 will be briefly described. The first reason why the content 20 is agitated by the agitation units 23 is to uniformly heat the content 20 with microwaves. Although depending on the type of content 20 and the temperature of the content, the depth to which microwaves penetrate is constant, and, thus, the agitation is performed in order to uniformly irradiate and uniformly heat the entire content 20 with microwaves. Furthermore, the content 20 can be more efficiently irradiated with microwaves as the surface area of the content 20 at the unfilled space 22 increases. Accordingly, the second reason why the content 20 is agitated is to increase the area subjected to microwave irradiation. Thus, the content 20 is agitated by the agitation units 23 preferably at an intensity that allows the surface of the content 20 at the unfilled space 22 to be disordered, but there is no limitation to this. If the agitation is performed for the first reason, it may be sufficient that the entire content 20 is eventually heated. Furthermore, since the raw material and the like are agitated using the agitation units 23 in this manner, even in the case where a raw material contains two or more materials having different densities, these materials can be mixed and reacted with each other as appropriate. For example, when causing materials having different densities, such as alcohol and waste oil, to react with each other in a vertical flow-type reactor, these materials are easily separated from each other. However, as in this example, if the reactor 13 is of a horizontal flow-type and is provided with the agitation units 23, these materials can be mixed and reacted with each other as appropriate.

Furthermore, as shown in FIG. 2A, the reactor 13 also may have the temperature measuring portions 25. That is to say, the chemical reaction apparatus 1 according to this example may have the temperature measuring portions 25 that measure the temperature inside the reactor 13. The temperature inside the reactor 13 is preferably the temperature of the content 20 of the reactor 13. FIG. 2A shows the case in which the chambers 31 to 34 respectively have the temperature measuring portions 25, but there is no limitation to this. One or more chambers may not have the temperature measuring portion 25. Although FIG. 2A merely schematically shows the temperature measuring portions 25, the temperature measuring portions 25 may measure the temperature, for example, using a thermocouple, an infrared sensor, an optical fiber, or other methods. The temperature measured by the temperature measuring portions 25 (strictly speaking, data indicating the temperature) is passed to the microwave control portion 16, and is used to control the output of microwaves from the microwave generators 14. As described above, this control may be control for keeping the temperature in the chambers 31 to 34 at a desired temperature or in a desired temperature range. For example, if microwaves are irradiated on the position of each of the partition plates 41 to 43, the output of microwaves irradiated on that position may be controlled, for example, using one of the temperatures in two chambers that have been partitioned from each other by that partition plate at the position subjected to the microwave irradiation, or both of the temperatures. In the former case, for example, the control may be performed using a lower temperature, using a higher temperature, or using a temperature in a chamber specified in advance. In the latter case, for example, the control may be performed using an average of these temperatures, or using a weighted average according to the capacities of both chambers (i.e., average in consideration of weights according to the capacities of the chambers).

Next, the partition plates 41 to 43 will be described. The content 20 such as a raw material loaded into the reactor 13 flows through the chambers 31 to 34 and is finally discharged from the downstream side (e.g., the right end of the reactor 13 in FIG. 2A). Note that a flow path that allows the content to flow is formed at the partition plates 41 to 43. As described above, at the partition plates 41 and 43 in the reactor 13 in FIG. 2A, the flow path is an overflow-type flow path extending over the partition plates 41 and 43, and, at the partition plate 42, the flow path is an underflow-type flow path 40 extending under the partition plate 42. The flow path allows the content 20 to flow from the upstream side (e.g., the left side in FIG. 2A) to the downstream side (e.g., the right side in FIG. 2A) in the reactor 13. The direction in which the content 20 flows inside the reactor 13 in FIGS. 2A and 2B also includes an upper-lower direction in the strict sense, but, as a whole, it is a direction from the left to the right, and thus it can be said that the content 20 horizontally flows inside the reactor 13.

Figure 4A:
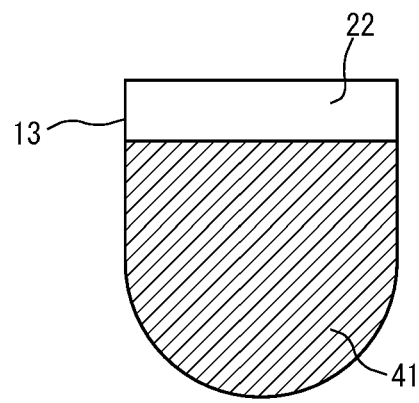
FIG. 4A is a diagram showing an example of the shape of an overflow-type partition plate in this example.
Figure 4B:
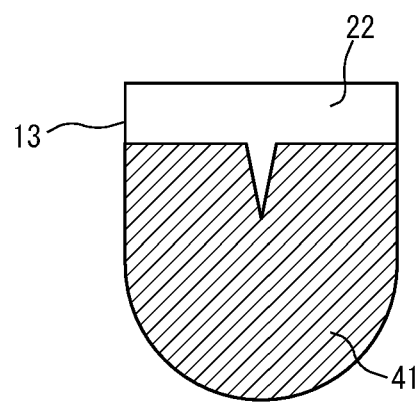
FIG. 4B is a diagram showing an example of the shape of the overflow-type partition plate in this example.
Figure 4C:
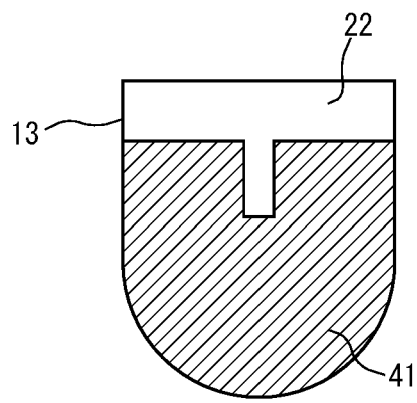
FIG. 4C is a diagram showing an example of the shape of the overflow-type partition plate in this example.
Figure 4D:
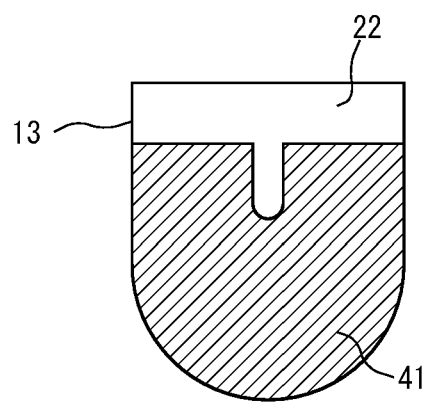
FIG. 4D is a diagram showing an example of the shape of the overflow-type partition plate in this example.
Figure 4E:
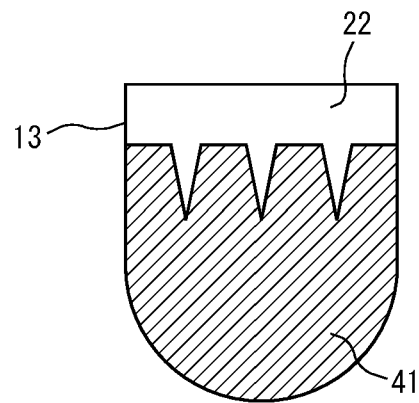
FIG. 4E is a diagram showing an example of the shape of the overflow-type partition plate in this example.

FIGS. 4A to 4E are diagrams of the overflow-type partition plate 41 as viewed from the longitudinal direction of the reactor 13. The below is a description of the partition plate 41, but the same is applicable to the overflow-type partition plate 43 as well. The partition plate 41 does not extend to the position of the unfilled space 22, and the content 20 flows through that position (that is, over the partition plate 41). On the overflow-type flow path, the partition plate 41 may have no recess such as notch or cutout and an overflow-type flow path may be formed throughout the width of the reactor 13 (full-width weir) as shown in FIG. 4A. Alternatively, on the overflow-type flow path, the partition plate 41 may have a recess as shown in FIGS. 4B to 4E. The number of recesses may be one as in the partition plate 41 in FIGS. 4B to 4D, may be three as in the partition plate 41 in FIG. 4E, or may be other numbers (e.g., two, or four or more). The shape of the flow path in the form of a recess may be a V-shape (triangular shape) as shown in FIGS. 4B and 4E, may be a quadrangular shape (rectangular shape) as shown in FIG. 4C, may be a U-shape as shown in FIG. 4D, or may be other shapes (e.g., semi-circular shape, semi-elliptic shape, trapezoidal shape, etc.).

Figure 5A:
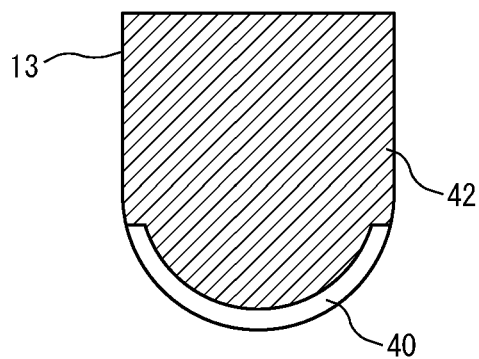
FIG. 5A is a diagram showing an example of the shape of an underflow-type partition plate in this example.
Figure 5B:
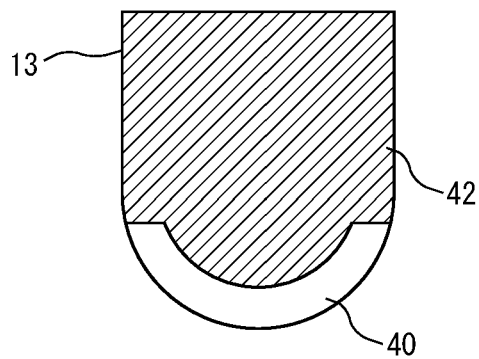
FIG. 5B is a diagram showing an example of the shape of the underflow-type partition plate in this example.

FIGS. 5A and 5B are diagrams of the underflow-type partition plate 42 as viewed from the longitudinal direction of the reactor 13. The flow path 40 of the content 20 is present under the partition plate 42. In the flow path 40, the distance between the partition plate and the lower face of the reactor 13 may be constant as shown in FIGS. 5A and 5B, or may not be constant. In the former case, the flow rate of the content 20 at the flow path 40 can be made more uniform, and a situation where the content 20 flows through mainly a portion of the flow path 40 is suppressed, and thus the retention time of the content 20 in a chamber having the partition plate 42 on the outlet side can be made longer. The flow path 40 may have any width according to the type of the content 20 and the like as shown in FIGS. 5A and 5B. The distance between the underflow-type partition plate 42 and the lower face of the reactor 13 in the flow path 40 may be referred to as the distance in the normal direction of an inner face on the lower side of the reactor 13. It is preferable that the underflow-type flow path 40 is present on the lower side of the underflow-type partition plate 42 and does not extend to the lateral sides thereof. The reason for this is that, if the flow path is present on the lateral sides of the underflow-type partition plate 42, the movement distance of the content 20 may be shortened at a portion where the overflow-type partition plate 41 and the underflow-type partition plate 42 are adjacent to each other. The state in which the flow path is not present on the lateral sides of the underflow-type partition plate 42 may be referred to as a state in which the content 20 mainly flows on the lower side more than the lateral sides of the underflow-type partition plate 42.

Figure 5C:
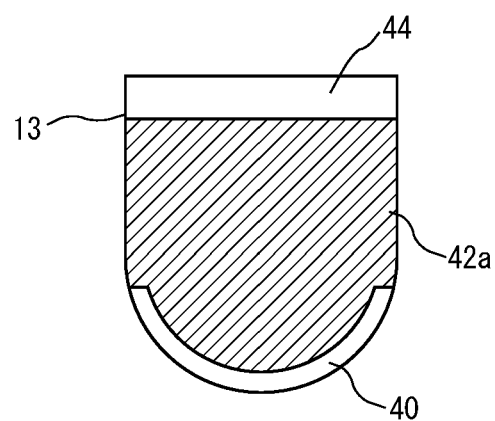
FIG. 5C is a diagram showing an example of the shape of the underflow-type partition plate in this example.
Figure 5D:
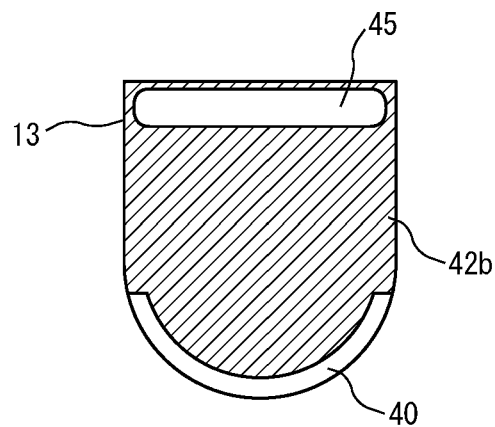
FIG. 5D is a diagram showing an example of the shape of the underflow-type partition plate in this example.

Furthermore, as in an underflow-type partition plate 42a shown in FIGS. 2B and 5C, a portion of the partition plate 42a corresponding to the unfilled space 22 may be provided with a space 44 through which microwaves can pass. If such a space 44 is provided, the unfilled space 22 can be prevented from being divided by the underflow-type partition plate 42a. The space through which microwaves can pass may be realized by a through hole 45 for microwaves, which is provided through an underflow-type partition plate 42b shown in FIG. 5D. The space 44 and the through hole 45 are preferably provided at positions where the content 20 does not flow. The reason for this is that an overflow-type flow path is prevented from being formed through the underflow-type partition plates 42a and 42b.

Figure 4F:
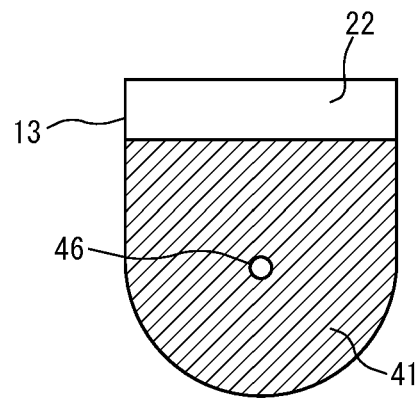
FIG. 4F is a diagram showing an example of the shape of the overflow-type partition plate in this example.
Figure 5E:
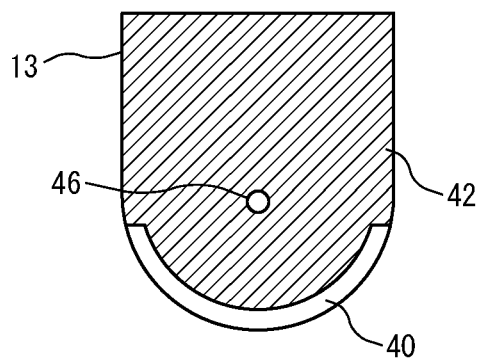
FIG. 5E is a diagram showing an example of the shape of the underflow-type partition plate in this example.

If multiple overflow-type partition plates are present in the reactor 13, the partition plates may or may not have the same shape. If multiple underflow-type partition plates are present in the reactor 13, the partition plates may or may not have the same shape. Each of the partition plates 41 to 43 may have a thickness of, for example, approximately 1 to 30 mm, or other thicknesses. In any case, the thickness of each of the partition plates 41 to 43 is sufficiently smaller than the length of each of the chambers 31 to 34. The length of each of the chambers 31 to 34 is a length in the longitudinal direction of the reactor 13. As shown in FIGS. 4F and 5E, the partition plates 41 to 43 may be provided with a hole 46 through which a shaft of an agitation unit extends. Even if such a hole 46 is present, it is preferable that the content 20 mainly flows through the overflow-type flow path or the underflow-type flow path 40. That is to say, it is preferable that the gap between the hole 46 and the shaft is small.

Figure 3A:
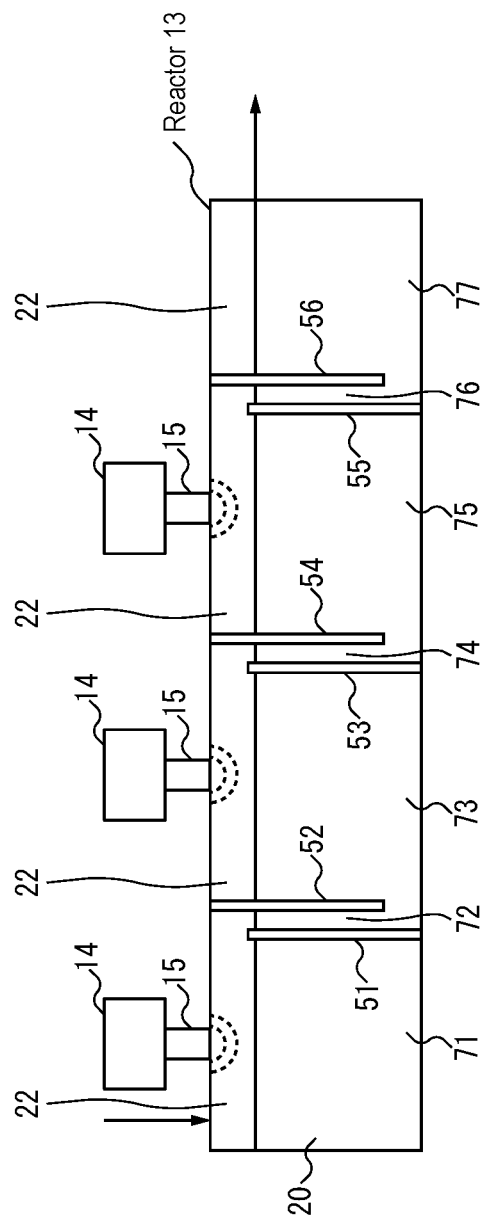
FIG. 3A is a diagram showing an example of the configuration inside the reactor in this example.

In the reactor 13 in FIGS. 2A and 2B, distances between the partition plates 41 to 43 are equal, but there is no limitation to this. For example, as shown in FIG. 3A, a distance between two partition plates arranged adjacent to each other along the flow direction in the order of an underflow-type partition plate and an overflow-type partition plate may be larger than a distance between two partition plates arranged adjacent to each other along the flow direction in the order of an overflow-type partition plate and an underflow-type partition plate. The flow direction refers to a direction in which the content 20 flows, and to a direction from the upstream side to the downstream side. In FIG. 3A, the rightward direction in the drawing is the flow direction. In FIG. 3A, partition plates 51, 53, and 55 are overflow-type partition plates, and partition plates 52, 54, and 56 are underflow-type partition plates. In FIG. 3A, the two partition plates arranged adjacent to each other along the flow direction in the order of an underflow-type partition plate and an overflow-type partition plate are, for example, the partition plates 52 and 53 and the partition plates 54 and 55. In FIG. 3A, the two partition plates arranged adjacent to each other along the flow direction in the order of an overflow-type partition plate and an underflow-type partition plate are, for example, the partition plates 51 and 52, the partition plates 53 and 54, and the partition plates 55 and 56. That is to say, each of the distance between the partition plates 51 and 52, the distance between the partition plates 53 and 54, and the distance between the partition plates 55 and 56 is smaller than each of the distance between the partition plates 52 and 53 and the distance between the partition plates 54 and 55. FIG. 3A shows the case in which all of the smaller distances, that is, all of the distance between the partition plates 51 and 52, the distance between the partition plates 53 and 54, and the distance between the partition plates 55 and 56 are the same, and all of the larger distances, that is, all of the distance between the partition plates 52 and 53 and the distance between the partition plates 54 and 55 are the same, but there is no limitation to this.

Figure 3B:
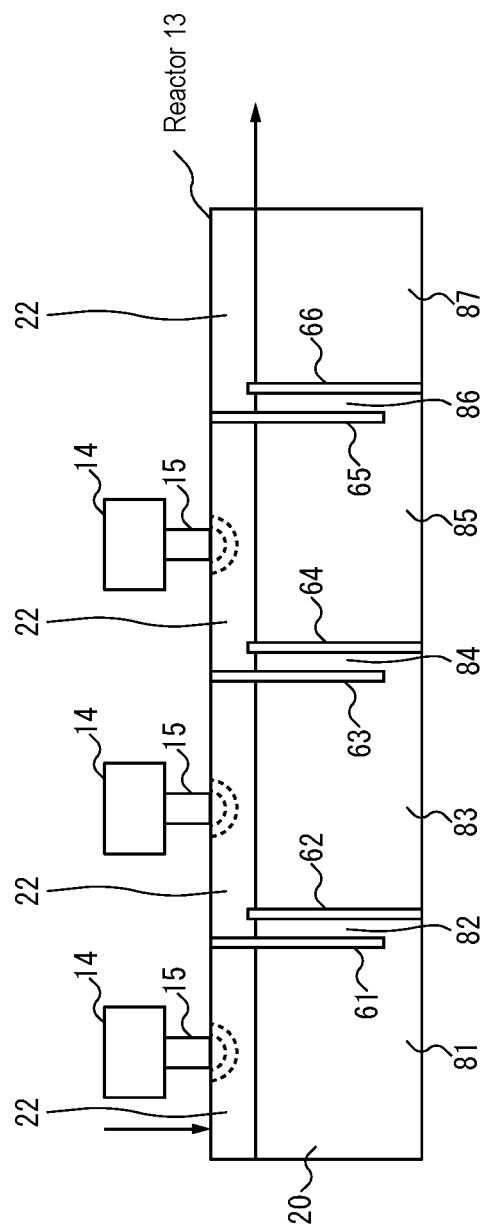
FIG. 3B is a diagram showing an example of the configuration inside the reactor in this example.

Furthermore, for example, as shown in FIG. 3B, a distance between two partition plates arranged adjacent to each other along the flow direction in the order of an overflow-type partition plate and an underflow-type partition plate may be larger than a distance between two partition plates arranged adjacent to each other along the flow direction in the order of an underflow-type partition plate and an overflow-type partition plate. Also in FIG. 3B, the rightward direction in the drawing is the flow direction. In FIG. 3B, partition plates 61, 63, and 65 are underflow-type partition plates, and partition plates 62, 64, and 66 are overflow-type partition plates. In FIG. 3B, the two partition plates arranged adjacent to each other along the flow direction in the order of an overflow-type partition plate and an underflow-type partition plate are, for example, the partition plates 62 and 63 and the partition plates 64 and 65. In FIG. 3B, the two partition plates arranged adjacent to each other along the flow direction in the order of an underflow-type partition plate and an overflow-type partition plate are, for example, the partition plates 61 and 62, the partition plates 63 and 64, and the partition plates 65 and 66. That is to say, each of the distance between the partition plates 61 and 62, the distance between the partition plates 63 and 64, and the distance between the partition plates 65 and 66 is smaller than each of the distance between the partition plates 62 and 63 and the distance between the partition plates 64 and 65. FIG. 3B shows the case in which all of the smaller distances, that is, all of the distance between the partition plates 61 and 62, the distance between the partition plates 63 and 64, and the distance between the partition plates 65 and 66 are the same, and all of the larger distances, that is, all of the distance between the partition plates 62 and 63 and the distance between the partition plates 64 and 65 are the same, but there is no limitation to this.

In FIGS. 3A and 3B, for the sake of ease of description, the agitation units 23 and the temperature measuring portions 25 are not shown, but it will be appreciated that the agitation units 23 and the temperature measuring portions 25 may be present in the reactor 13. In the reactor 13 in FIGS. 3A and 3B, the agitation units 23 may be present in at least any of wider chambers 71, 73, 75, and 77, and may be present in at least any of wider chambers 81, 83, 85, and 87. In the reactor 13 in FIGS. 3A and 3B, the agitation units 23 may not be present in narrow chambers 72, 74, 76, 82, 84, and 86. In the wider chambers in the reactor 13 in FIGS. 3A and 3B, the content 20 flows in from the upper side and flows out from the lower side or flows in from the lower side and flows out from the upper side, and thus, if agitation is performed in the wider chambers, the content 20 can be effectively agitated and can be prevented from flowing in a shortcut.

Furthermore, in the reactor 13 in FIG. 3A, the content 20 flows downward in the narrow chambers 72, 74, and 76, and thus, for example, if the specific gravity of the solid catalyst that flows inside the reactor 13 is smaller than that of the content 20, adjustment of the flow rate makes it possible to prevent the solid catalyst from flowing through the chamber 72 and the like, that is, to retain the solid catalyst in the chamber 72 and the like and prevent the solid catalyst from moving to the next chamber. Thus, it is possible to continuously use the solid catalyst, and to reduce or eliminate the necessity for a solid catalyst to be newly loaded.

Furthermore, in the reactor 13 in FIG. 3B, the content 20 flows upward in the narrow chambers 82, 84, and 86, and thus, for example, if the specific gravity of the solid catalyst that flows inside the reactor 13 is larger than that of the content 20, adjustment of the flow rate makes it possible to prevent the solid catalyst from flowing through the chamber 82 and the like, that is, to retain the solid catalyst in the chamber 82 and the like and prevent the solid catalyst from moving to the next chamber. Thus, it is possible to continuously use the solid catalyst, and to reduce or eliminate the necessity for a solid catalyst to be newly loaded.

Furthermore, in the reactor 13 in FIGS. 3A and 3B, the retention time of the content 20 in wider chambers such as the chamber 73 and the chamber 83 is longer, and, if the agitation units 23 are present, microwaves are more uniformly irradiated, and thus the wider chambers may be mainly irradiated with microwaves. Thus, for example, in the reactor 13 in FIG. 3A, the waveguide 15 may be positioned at the middle of the chamber defined by the two partition plates arranged adjacent to each other along the flow direction in the order of an underflow-type partition plate and an overflow-type partition plate. The middle is the middle in the longitudinal direction of the reactor 13. For example, in the reactor 13 in FIG. 3B, the waveguide 15 may be positioned at the middle of the chamber defined by the two partition plates arranged adjacent to each other along the flow direction in the order of an overflow-type partition plate and an underflow-type partition plate. The middle of a chamber may be an exact middle or may be a position around the middle.

FIGS. 3A and 3B show the case in which a portion of the underflow-type partition plate corresponding to the unfilled space 22 is not provided with a space through which microwaves can pass, but there is no limitation to this. The partition plate 52 and the like may be provided with a space through which microwaves can pass, such as the partition plate 42$a$ shown in FIG. 5C or the partition plate 42$b$ shown in FIG. 5D.

Furthermore, the reactor 13 may be provided with both a portion where a distance between two partition plates arranged adjacent to each other along the flow direction in the order of an underflow-type partition plate and an overflow-type partition plate is larger than a distance between two partition plates arranged adjacent to each other along the flow direction in the order of an overflow-type partition plate and an underflow-type partition plate shown in FIG. 3A and a portion where a distance between two partition plates arranged adjacent to each other along the flow direction in the order of an overflow-type partition plate and an underflow-type partition plate is larger than a distance between two partition plates arranged adjacent to each other along the flow direction in the order of an underflow-type partition plate and an overflow-type partition plate shown in FIG. 3B. For example, the upstream side in the reactor 13 may be as shown in FIG. 3A, and the downstream side thereof may be as shown in FIG. 3B.

There is no particular limitation on a smaller distance among the distances between adjacent partition plates, but the distance may be, for example, 2 to 30 cm. There is no particular limitation on a larger distance among the distances between adjacent partition plates, but the distance may be, for example, 20 to 100 cm. The larger distance may be 2 to 10 times the smaller distance.

There is no particular limitation on the reaction that is caused in the chemical reaction apparatus 1 according to this example, but the reaction may be, for example, esterification reaction, transesterification reaction, ion-exchange reaction, amidation reaction, halogenation reaction, amine substitution reaction, or other substitution reaction, or may be addition reaction, elimination reaction, rearrangement reaction, or the like.

As described above, according to the chemical reaction apparatus 1 of this example, in a portion where an overflow-type partition plate and an underflow-type partition plate are adjacent to each other, the content 20 moves from below to above or from above to below inside the reactor 13, and the movement distance of the content 20 increases. As a result, the content 20 is irradiated with microwaves for a longer period of time, and the possibility that an unreacted content is discharged can be reduced. If an agitation unit is present in a chamber sandwiched between an overflow-type partition plate and an underflow-type partition plate, the content 20 passes through the position of the agitation unit in the chamber when flowing from the upstream side to the downstream side, and, as a result, the content 20 is properly agitated, and the reaction is facilitated.

In this example, the case has been described where the mixing portion 12 that mixes the raw material and the catalyst is provided, but there is no limitation to this. For example, if a premixure of the raw material and the catalyst is used, if the mixing is also performed by the reactor 13, if the solid catalyst that flows inside the reactor 13 is retained in the reactor 13, if a solid catalyst forming a fixed bed is used instead of the solid catalyst that flows inside the reactor 13, or if no catalyst is used, the chemical reaction apparatus 1 does not have to be provided with the mixing portion 12. Note that, if a solid catalyst forming a fixed bed is used, typically, the solid catalyst forming a fixed bed is provided inside the reactor 13. The solid catalyst forming a fixed bed may be fixed, for example, by being pasted on the inner wall of the reactor 13, or by being placed in a layer, a column, or the like that is to be filled with the catalyst, inside the reactor 13. Examples of the shape of the solid catalyst include various grains, a cylinder (that may or may not be hollow, for example), a sphere, a pellet, a ring, a shell, a honeycomb, a foam, a fiber, a cloth, a plate, and other shapes.

Furthermore, in this example, for example, the case has been described where the reactor 13 has four chambers that are continuously arranged in series as shown in FIG. 2A, etc., but the number of chambers is not limited to four or seven, and may be other numbers. Typically, as the number of chambers increases, a situation can be more effectively prevented in which the raw material flows in a shortcut from the inlet to the outlet of the reactor 13.

Furthermore, in this example, the case has been described where the chemical reaction apparatus 1 is provided with the temperature measuring portions 25 and the microwave control portion 16, but there is no limitation to this. For example, if it is possible to keep the temperature inside the reactor 13 at a desired temperature or in a desired temperature range by setting the output of microwaves to a predetermined value, the control of the output of microwaves using the temperature does not have to be performed.

Furthermore, in this example, the case has been described where the catalyst separating portion 17 is provided on the path after the reactor 13, but there is no limitation to this. If the catalyst does not have to be separated by the chemical reaction apparatus 1 according to this example, as in the case in which the catalyst is separated by another apparatus, the case in which the solid catalyst that flows inside the reactor 13 is retained in the reactor 13, the case in which a solid catalyst forming a fixed bed is used instead of the solid catalyst that flows inside the reactor 13, or the case in which no catalyst is used in the chemical reaction in the reactor 13, the catalyst separating portion 17 does not have to be provided.

Furthermore, in this example, the case has been described where the raw material and the catalyst are mixed and loaded into the reactor 13, but there is no limitation to this. For example, only the raw material may be loaded into the reactor 13. Furthermore, if the raw material and the catalyst are not mixed, only the raw material may flow inside the reactor 13. That is to say, the content of the reactor 13 may be, for example, a mixture of multiple raw materials. Furthermore, even in the case where the raw material and the catalyst are not mixed, for example, the raw material and the catalyst may flow inside the reactor 13 when the solid catalyst that flows inside the reactor 13 is retained in the reactor 13. Furthermore, if the raw material and the catalyst are not mixed, the mixing portion 12 may, for example, mix the raw material, or mix the raw material (substrate) and the reactant. Furthermore, if the raw material and the like do not have to be mixed, the chemical reaction apparatus 1 does not have to be provided with the mixing portion 12 as described above.

Furthermore, in this example, the case has been described where one or more agitation units 23 that agitate the raw material inside the reactor 13 are provided, but there is no limitation to this. For example, if the reactor 13 is configured such that the entire raw material can be easily irradiated with microwaves (e.g., if the inner diameter of the reactor 13 is small, etc.), the agitation units 23 do not have to be provided.

Furthermore, in this example, the case has been described where the chemical reaction apparatus 1 is provided with the treated liquid storage tank 18, but there is no limitation to this. For example, a mixture of the product material and the by-product discharged from the chemical reaction apparatus 1 may be subjected to extraction of the product material and the like in another apparatus.

Furthermore, it will be appreciated that the present invention is not limited to the example set forth herein, and various modifications are possible within the scope of the present invention.

As described above, the chemical reaction apparatus according to the present invention is effective in that discharge of an unreacted content can be suppressed, and, thus, this apparatus is useful, for example, as a chemical reaction apparatus for irradiating a content with microwaves.

The invention claimed is:

1. A chemical reaction apparatus, comprising:
a liquid content;
a horizontal flow-type reactor configured to allow the liquid content to flow horizontally comprising:
an unfilled space above the liquid content;
a microwave generator that generates microwaves;
a waveguide that transmits the microwaves generated by the microwave generator to the unfilled space in the reactor; and
a plurality of partition plates partitioning the inside of the reactor into multiple chambers comprising at least one of:
an overflow-type partition plate that only allows the content to flow thereover; and
an underflow-type partition plate that only allows the content to flow thereunder, wherein each underflow-type partition plate has an aperture higher than the top of the overflow-type partition plate, and above the liquid content, and wherein microwaves can pass through the aperture;
wherein the unfilled space is continuous above the plurality of partition plates in the reactor.

2. The chemical reaction apparatus according to claim 1, wherein the overflow-type partition plate and the underflow-type partition plate are alternately arranged along a flow direction of the content.

3. The chemical reaction apparatus according to claim 2, wherein a distance between two partition plates arranged adjacent to each other along the flow direction in the order of an overflow-type partition plate and an underflow-type partition plate is larger than a distance between two partition plates arranged adjacent to each other along the flow direction in the order of an underflow-type partition plate and an overflow-type partition plate.

4. The chemical reaction apparatus according to claim 2, wherein a distance between two partition plates arranged adjacent to each other along the flow direction in the order of an underflow-type partition plate and an overflow-type partition plate is larger than a distance between two partition plates arranged adjacent to each other along the flow direction in the order of an overflow-type partition plate and an underflow-type partition plate.

5. The chemical reaction apparatus according to claim 1, wherein a first distance between any two adjacent partition plates is equal to a second distance measured between any other two adjacent partition plates.

6. The chemical reaction apparatus according to claim 1, wherein the bottom of all the underflow-type partition plates are the same distance away from the bottom of the reactor.

7. A chemical reaction apparatus, comprising:
a liquid content;
a horizontal flow-type reactor configured to allow the liquid content to flow horizontally;
a plurality of partition plates partitioning the inside of the reactor into multiple chambers comprising at least one of:
an overflow-type partition plate allowing the liquid content to only flow over the overflow-type partition plate; and
an underflow-type partition plate allowing the liquid content to only flow under the underflow-type partition plate, the underflow-type partition plate including an aperture higher than the top of the overflow-type partition, and above the liquid content;
a microwave generator that generates microwaves; and
a waveguide that transmits the microwaves generated by the microwave generator, wherein the microwaves pass through the aperture,
wherein the entire liquid flow in the reactor is continuously separated from the top of the reactor by a constant distance.

* * * * *